(12) United States Patent
Yokota et al.

(10) Patent No.: US 9,205,813 B2
(45) Date of Patent: Dec. 8, 2015

(54) PARKING LOCK DEVICE FOR TRANSMISSION

(71) Applicant: HONDA MOTOR CO., LTD., Tokyo (JP)

(72) Inventors: Hirotaka Yokota, Wako (JP); Shunsuke Yoshida, Wako (JP); Yutaka Ishikawa, Wako (JP); Tetsuya Mochizuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/108,797

(22) Filed: Dec. 17, 2013

(65) Prior Publication Data

US 2014/0190784 A1 Jul. 10, 2014

(30) Foreign Application Priority Data

Jan. 10, 2013 (JP) ................................. 2013-002238

(51) Int. Cl.
*B60T 1/00* (2006.01)
*F16H 63/34* (2006.01)

(52) U.S. Cl.
CPC ............ *B60T 1/005* (2013.01); *F16H 63/3416* (2013.01)

(58) Field of Classification Search
CPC ............ F16H 63/3425; F16H 63/3483; F16H 63/3491; F16H 63/38; B60T 1/005; B60T 1/00
See application file for complete search history.

(56) References Cited

U.S. PATENT DOCUMENTS

| 7,861,839 B2 * | 1/2011 | Schweiher et al. ......... 192/220.2 |
| 2003/0019702 A1 * | 1/2003 | Goedecke et al. ............ 188/353 |
| 2008/0277236 A1 | 11/2008 | Ruhringer et al. |

FOREIGN PATENT DOCUMENTS

| JP | 06-174085 A | 6/1994 |
| JP | 06-221422 A | 8/1994 |
| JP | 2007-303680 A | 11/2007 |
| JP | 2008-503695 A | 2/2008 |
| JP | 2009-068588 A | 4/2009 |
| JP | 2010-210021 A | 9/2010 |

OTHER PUBLICATIONS

Decision of Granting a Patent dated Jan. 28, 2015, issued in corresponding Japanese Patent Application No. 2013-002238 (3 pages).

* cited by examiner

*Primary Examiner* — Huan Le
(74) *Attorney, Agent, or Firm* — Westerman, Hattori, Daniels & Adrian, LLP

(57) ABSTRACT

In case of power supply loss, a parking lock is operated by moving a piston of a hydraulic actuator rightward by use of hydraulic pressure accumulated in an accumulator. If a hydraulic pressure generating source becomes unable to generate line pressure due to its failure after the power supply loss, it is desirable that the parking lock be releasable to tow a vehicle, for example. In that time, because the hydraulic pressure in the accumulator has got out via an orifice, the parking lock can be released by moving the piston in the hydraulic actuator leftward by use of a manual operation device without interruption by the hydraulic pressure accumulated in the accumulator. Because the hydraulic pressure in the accumulator is automatically released via the orifice, a complicated mechanism for enabling the manual operation device to work without interference from the hydraulic actuator becomes unnecessary.

7 Claims, 7 Drawing Sheets

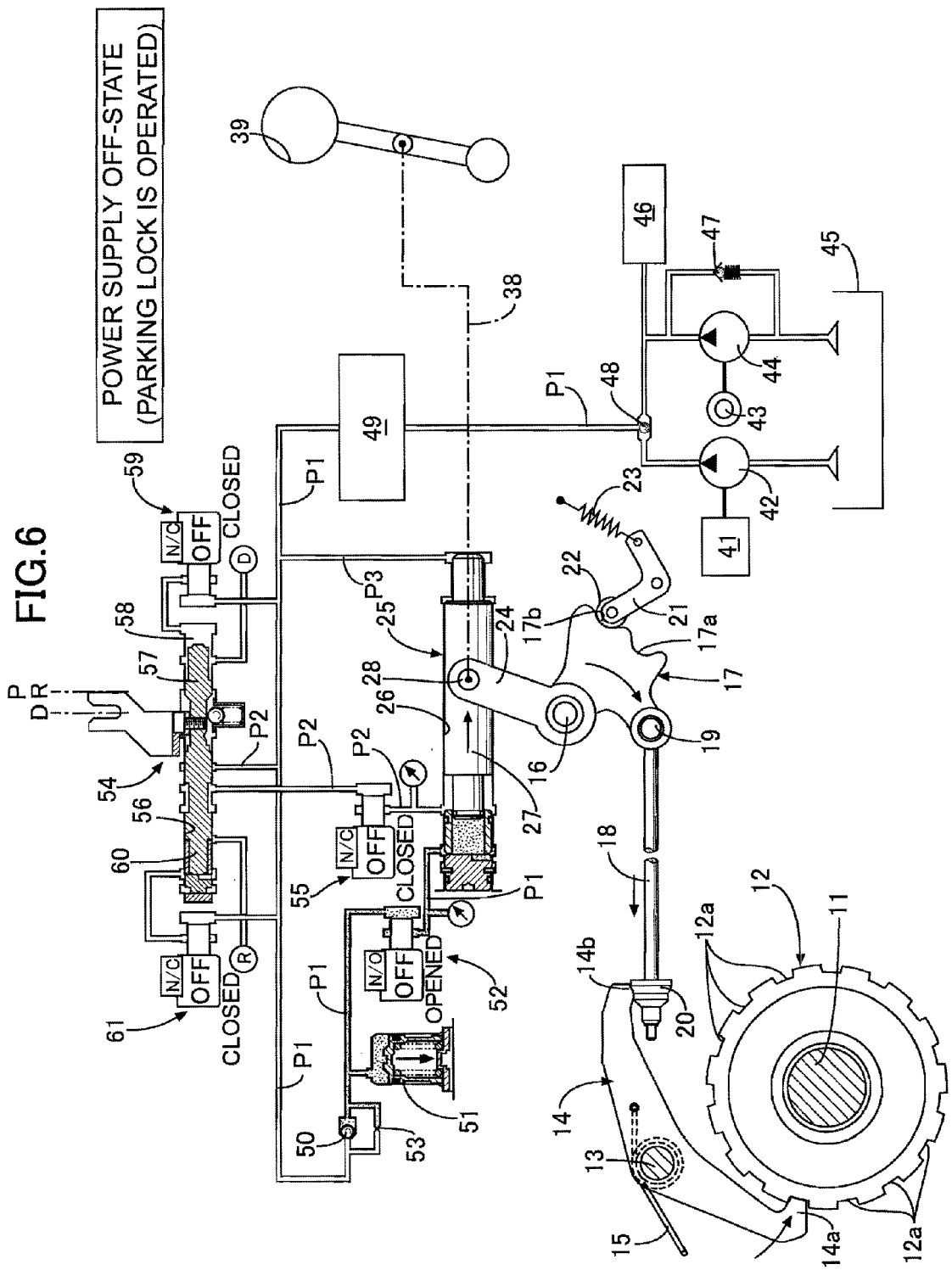

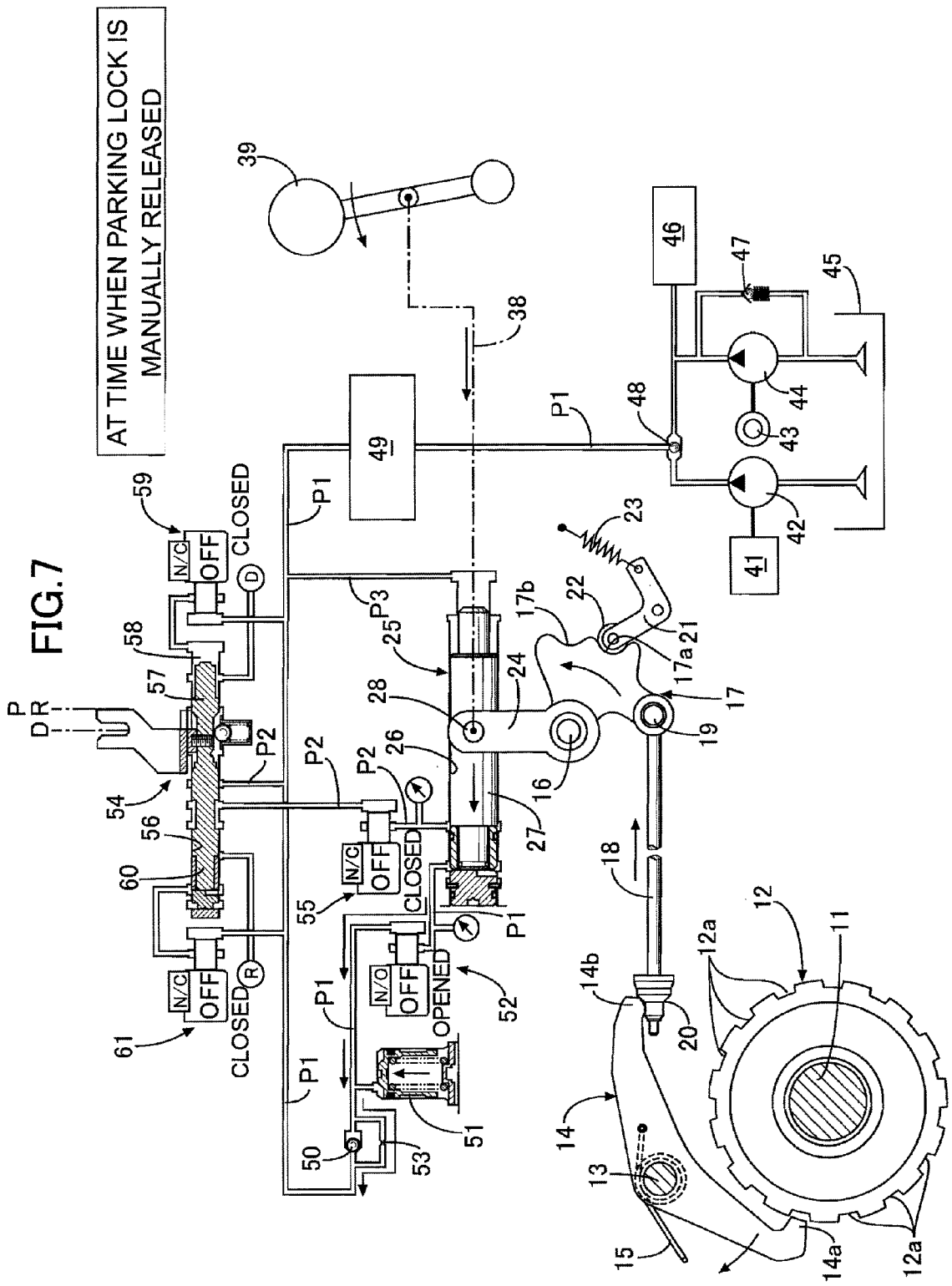

PARKING LOCK DEVICE FOR TRANSMISSION

BACKGROUND OF THE INVENTION

1. Field of the Invention

The present invention relates to a parking lock device for a transmission including: a parking gear; a parking pawl configured to be lockable when in mesh with the parking gear; a hydraulic pressure generating source configured to generate line pressure; a hydraulic actuator configured to operate the parking pawl into a lock position and an unlock position by use of the line pressure; and a manual release device for manually operating the parking pawl into the unlock position.

2. Description of the Related Art

Published Japanese Translation No. 2008-503695 of PCT/EP2005/006026 has made publicly known a parking lock device which is configured to be operated by a hydraulic actuator having a piston, and which includes: a latch configured to hold the piston at a parking lock release position; and a solenoid configured to enable the piston to move to a parking lock operation position by unlatching the latch.

SUMMARY OF THE INVENTION

In the parking lock device described in Published Japanese Translation No. 2008-503695 of PCT/EP2005/006026, however, when the solenoid becomes inoperable due to power supply loss, the latch is unlatched and the piston is fixed at the parking lock operation position. For this reason, the parking lock device needs a mechanism configured to engage the piston and the latch with each other separately from the solenoid, or a mechanism configured to compress the spring. This presents a problem of complicating a structure for the mechanism.

Meanwhile, it is desirable that an operation of the parking lock device can be manually released so as to move a vehicle by a method such as towing or the like other than self-propelling, even in a case where a hydraulic system or an electrical system becomes inoperable due to some failure while the parking lock device is in operation. In such a case, it is desirable that the operation of the parking lock device can be manually released by as simple a structure as possible.

The present invention has been made with the foregoing matter taken into consideration. An object of the present invention is to make a parking lock releasable with a simple structure in case of failure of the hydraulic system and the electrical system.

In order to achieve the object, according to a first aspect of the present invention, there is provided a parking lock device for a transmission including: a parking gear; a parking pawl configured to be lockable when in mesh with the parking gear; a hydraulic pressure generating source configured to generate line pressure; a hydraulic actuator configured to operate the parking pawl into a lock position and an unlock position by use of the line pressure; and a manual release device for manually operating the parking pawl into the unlock position, wherein the hydraulic actuator includes an unlock oil chamber at one end, and a lock oil chamber at the other end, the line pressure is transmitted to the unlock oil chamber, the line pressure can be transmitted to the lock oil chamber via a first solenoid valve, hydraulic pressure from an accumulator configured to accumulate the line pressure can be transmitted to the lock oil chamber via a second solenoid valve, a check valve configured to allow oil to flow toward the accumulator only is provided upstream of the accumulator, and an orifice is connected to the accumulator in parallel.

According to a configuration of the first aspect of the present invention, the parking lock device for a transmission includes: the parking gear; the parking pawl lockable when in mesh with the parking pawl; the hydraulic pressure generating source configured to generate the line pressure; the hydraulic actuator configured to operate the parking pawl into the lock position and the unlock position by use of the line pressure; and the manual release device for manually operating the parking pawl into the unlock position.

When a drive range or a reverse range is selected, the parking lock can be released by supplying the line pressure generated by the hydraulic pressure generating source to the unlock oil chamber in the hydraulic actuator. When a parking range is selected, the parking lock can be operated by: supplying the line pressure to the lock oil chamber in the hydraulic actuator; and thus generating a load which surpasses a load on the unlock oil chamber. In addition, in case of power supply loss, the parking lock can be operated by supplying the hydraulic pressure accumulated in the accumulator and checked by the check valve to the lock oil chamber via the second solenoid valve; and stopping the hydraulic pressure generating source.

In cases such as a case where the hydraulic pressure generating source becomes unable to generate the line pressure due to its failure during an operation of the parking lock, it is desirable that the parking lock be releasable for the purpose of moving the vehicle by a method such as towing or the like, other than self-propelling. In such a case, since the hydraulic pressure in the accumulator has got out via the orifice, the parking lock can be released by operating the hydraulic actuator by use of the manual release device without interference from the hydraulic pressure in the lock oil chamber connected to the accumulator. Since the hydraulic pressure accumulated in the accumulator is automatically made to get out via the orifice in this manner, a complicated mechanism for enabling the manual release device to work without interference from the hydraulic actuator becomes no longer necessary, and simplification of a structure can be achieved.

According to a second aspect of the present invention, in addition to the first aspect, the second solenoid valve is of a normally-open type.

According to a configuration of the second aspect of the present invention, the second solenoid valve is of the normally-open type. Therefore, in case of the power supply loss, the second solenoid valve is opened so that the hydraulic pressure accumulated in the accumulator is transmitted to the lock oil chamber via the second solenoid valve. Accordingly, the parking lock can be automatically operated.

According to a third aspect of the present invention, in addition to the first or second aspect, there is provided the parking lock device for a transmission further comprising: a first oil passage connecting the hydraulic pressure generating source to the second solenoid valve; a second oil passage branching from the first oil passage, and connected to the first solenoid valve; a third oil passage branching from the first oil passage, and connected to the unlock oil chamber; and a switching valve placed in the second oil passage, wherein when a driver selects a range other than a drive range, the switching valve establishes communication through the second oil passage, when the driver selects the drive range, the switching valve shuts off the second oil passage.

According to a configuration of the third aspect of the present invention, the parking lock device includes: the first oil passage connecting the hydraulic pressure generating source to the second solenoid valve; the second oil passage branching from the first oil passage, and connected to the first solenoid valve; the third oil passage branching from the first oil passage, and connected to the unlock oil chamber; and the switching valve placed in the second oil passage. For this reason, when the driver selects a range other than the drive range, the switching valve establishes the communication through the second oil passage. Thereby, the line pressure is transmitted to the lock oil chamber, and surpasses the hydraulic pressure transmitted to the unlock oil chamber. Accordingly, the parking lock can be operated. Furthermore, when the driver selects the drive range, the switching valve shuts off the second oil passage. Thereby, no line pressure is transmitted to the lock oil chamber, and the parking lock becomes unable to be operated. Accordingly, it is possible to prevent the parking lock from operating while the vehicle is traveling.

According to a fourth aspect of the present invention, in addition to the third aspect, the check valve is placed in the first oil passage, downstream of a branch part of the second oil passage in the first oil passage.

According to a configuration of the fourth aspect of the present invention, the check valve is placed in the first oil passage, downstream of the branch part of the second oil passage in the first oil passage. For this reason, it is possible to prevent the hydraulic pressure in the accumulator from leaking into the second oil passage.

According to a fifth aspect of the present invention, in addition to the first aspect, the hydraulic pressure generating source includes a first hydraulic pump driven by an engine, and a second hydraulic pump driven by a wheel, and of oil discharged by the first hydraulic pump and oil discharged by the second hydraulic pump, oil with a higher pressure is supplied via a three-way valve.

According to a configuration of the fifth aspect of the present invention, the hydraulic pressure generating source includes the first hydraulic pump driven by the engine, and the second hydraulic pump driven by the wheel; and of the oil discharged by the first hydraulic pump and the oil discharged by the second hydraulic pump, the oil with the higher pressure is supplied via the three-way valve. Thus, it is possible to release the parking lock by always generating the hydraulic pressure while the vehicle is traveling, and to block the parking lock from operating while the vehicle is traveling.

According to a sixth aspect of the present invention, in addition to the first aspect, the lock oil chamber includes a first lock oil chamber to which the line pressure can be transmitted via the first solenoid valve, and a second lock oil chamber to which the hydraulic pressure from the accumulator can be transmitted via the second solenoid valve, the hydraulic actuator includes a piston slidably fitted in a cylinder, and the piston includes an O-ring configured to seal a gap between the first lock oil chamber and the second lock oil chamber.

According to a configuration of the sixth aspect of the present invention, the lock oil chamber includes the first lock oil chamber to which the line pressure can be transmitted via the first solenoid valve, and the second lock oil chamber to which the hydraulic pressure from the accumulator can be transmitted via the second solenoid valve. For this reason, in case of the power supply loss, when the parking lock is operated by driving the piston by use of the hydraulic pressure transmitted to the second lock oil chamber from the accumulator, it is possible to prevent the hydraulic pressure in the second lock oil chamber from leaking via the first lock oil chamber and the first solenoid valve, and to operate the parking lock securely. At this time, the hydraulic actuator includes the piston slidably fitted in the cylinder, and the piston includes the O-ring configured to seal the gap between the first lock oil chamber and the second lock oil chamber. Accordingly, it is possible to block the hydraulic pressure in the second lock oil chamber from leaking into the first lock oil chamber by use of the O-ring, and to operate the parking lock more securely.

It should be noted that: a first lock oil chamber 33 and a second lock oil chamber 34 of an embodiment correspond to the lock oil chamber of the present invention; a manual operation lever 39 of the embodiment corresponds to the manual release device of the present invention; and a first hydraulic pump 42 and a second hydraulic pump 44 of the embodiment correspond to the hydraulic pressure generating source of the present invention.

The above and other objects, characteristics and advantages of the present invention will be clear from detailed descriptions of the preferred embodiment which will be provided below while referring to the attached drawings.

BRIEF DESCRIPTION OF THE DRAWINGS

FIG. 6 is an operation explanatory view of the parking lock device in a power supply-off state (parking lock operated).

FIG. 7 is an operation explanatory view of the parking lock device at a time when the parking lock is manually released.

DESCRIPTION OF THE PREFERRED EMBODIMENT

Descriptions will be hereinbelow provided for an embodiment of the present invention on the basis of FIG. 1 to FIG. 7.

Figure 1:
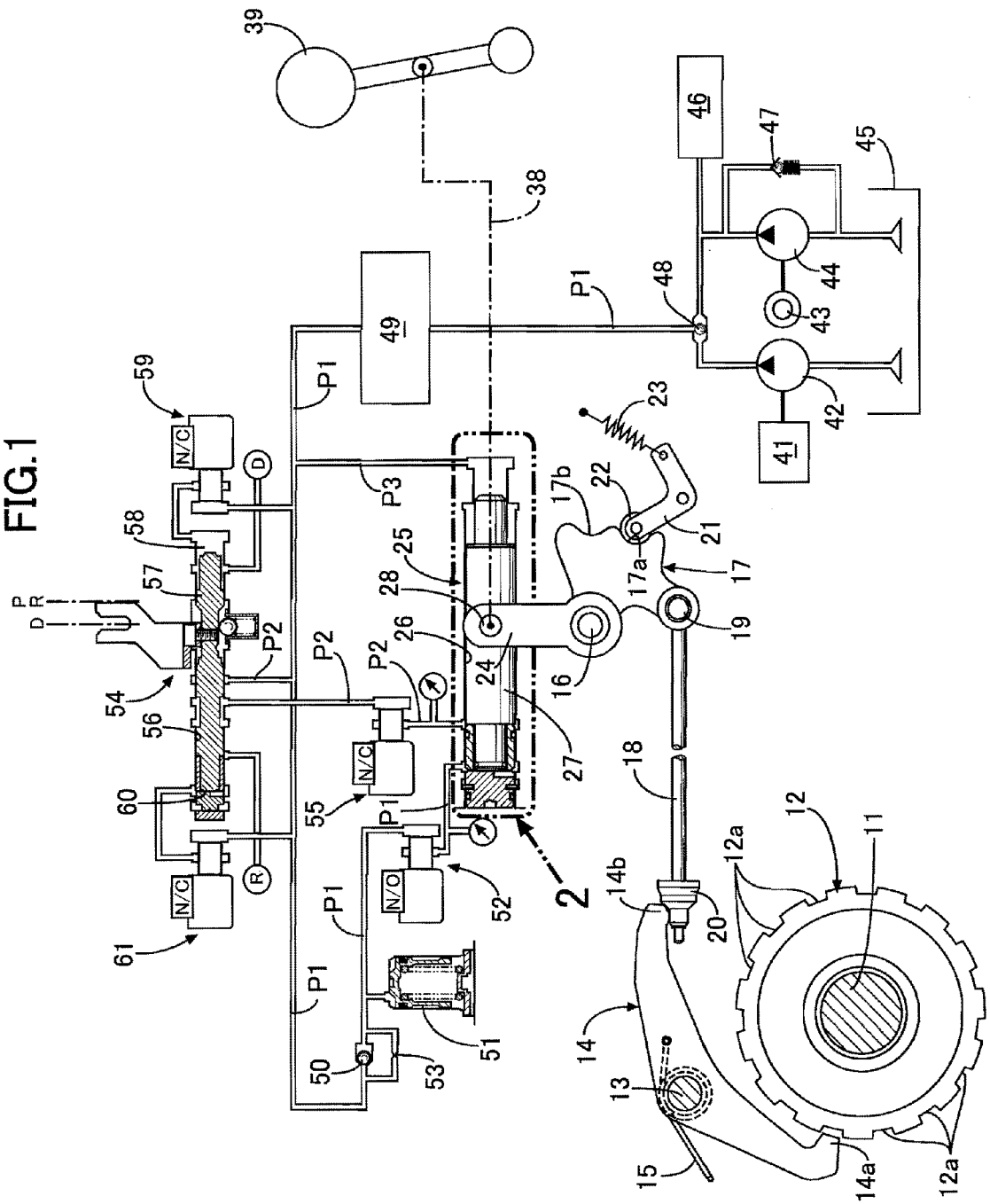
FIG. 1 is a view showing a structure of a parking lock device.
Figure 2:
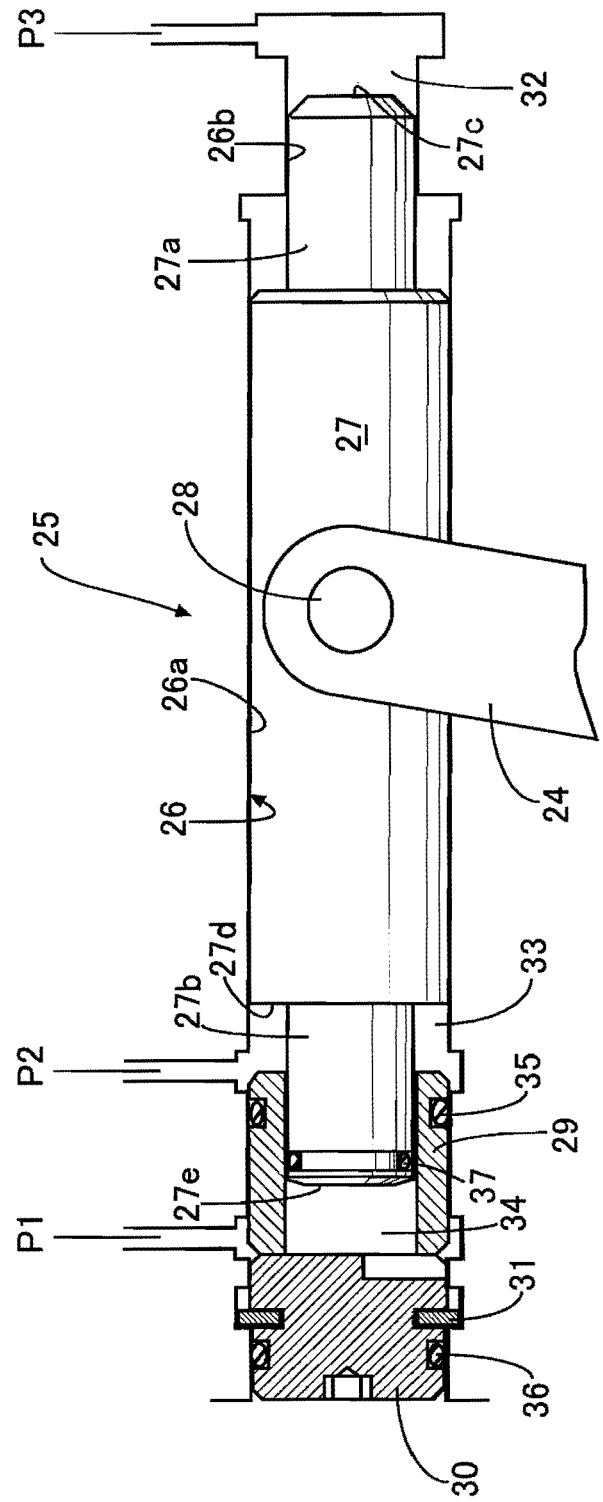
FIG. 2 is an enlarged view of a section 2 shown in FIG. 1.

To begin with, the structure of the parking lock device will be described on the basis of FIG. 1 and FIG. 2.

A parking gear 12 is fixed to a gearshift shaft 11 of a transmission. A locking claw 14a provided at one end of a parking pawl 14 pivotably supported by a spindle 13 is biased by a spring 15 in a detaching direction from tooth grooves 12a of the parking gear 12. One end of a parking rod 18 is pivotably supported by a detent plate 17, which is pivotably supported by a spindle 16, by use of a pin 19. A cone-shaped cam 20 provided at the other end of the parking rod 18 comes into contact with a cam follower 14b provided at the other end of the parking pawl 14. A detent roller 22 provided at one end of a swingable arm 21 is biased by a spring 23 so as to be engaged with one of two recessed portions 17a, 17b of the detent plate 17. A link 24 pivotably supported by the spindle 16 and configured to swing integrally with the detent plate 17 is connected to a hydraulic actuator 25.

The hydraulic actuator 25 includes a piston 27 slidably fitted in a cylinder 26. The link 24 is connected to the piston 27 by use of a pin 28. The cylinder 26 includes a large-diameter portion 26a and a small-diameter portion 26b continuously provided at a right end of the large-diameter portion 26a. A collar 29 and a plug 30 are fitted in a left end of the large-diameter portion 26a. The plug 30 is fixed to the cylinder 26 by use of a clip 31. A first small-diameter portion 27a fitted in the small-diameter portion 26b of the cylinder 26 is formed at a right end of the piston 27. In addition, a second small-diameter portion 27b fitted in an inner periphery of the collar 29 is formed at a left end of the piston 27.

An unlock pressure reception surface 27c at a right end of the first small-diameter portion 27a of the piston 27 faces an unlock oil chamber 32 formed in the small-diameter portion 26b of the cylinder 26. A first lock pressure reception surface 27d formed in a step portion at a right end of the second small-diameter portion 27b of the piston 27 faces a first lock oil chamber 33 formed at a left end of the large-diameter portion 26a of the cylinder 26. A second lock pressure reception surface 27e formed at a left end of the second small-diameter portion 27b of the piston 27 faces a second lock oil chamber 34 formed inside the collar 29.

An outer peripheral surface of the collar 29 is provided with an O-ring 35 configured to seal a gap between the outer peripheral surface of the collar 29 and the large-diameter portion 26a of the cylinder 26. An outer peripheral surface of the plug 30 is provided with an O-ring 36 configured to seal a gap between the outer peripheral surface of the plug 30 and the large-diameter portion 26a of the cylinder 26. The second small-diameter portion 27b of the piston 27 is provided with an O-ring 37 configured to seal a gap between the second small-diameter portion 27b and an inner peripheral surface of the collar 29.

The pin 28 configured to connect the piston 27 of the hydraulic actuator 25 to the link 24 is connected to a manual operation lever 39 by use of a cable 38. In case of emergency, the link 24 can be operated by manipulating the manual operation lever 39.

A first hydraulic pump 42 driven by an engine 41, and a second hydraulic pump 44 connected to and driven by a wheel 43 are equipped as a hydraulic pressure generating source for operating the hydraulic actuator 25. Part of oil pumped up from an oil tank 45 by the second hydraulic pump 44 is supplied to a lubricated portion 46 of the transmission. At this time, surplus oil in the supply operation is returned to the oil tank 45 via a relief valve 47. Of oil pumped up by the first hydraulic pump 42 from the oil tank 45 and oil pumped up by the second hydraulic pump 44 from the oil tank 45, oil with a higher pressure is supplied to a first oil passage P1 via a three-way valve 48.

The first oil passage P1 starts at the three-way valve 48, and is connected to the second lock oil chamber 34 (see FIG. 2) in the hydraulic actuator 25. A regulator valve 49, a check valve 50, an accumulator 51, and a second solenoid valve 52 made of a normally-open solenoid valve, which are configured to regulate the hydraulic pressure, are placed in the passage. The check valve 50 allows distribution of the oil from the three-way valve 48 side to the accumulator 51 side only, and regulates distribution of the oil in the reverse direction. An orifice 53 is connected in parallel with the check valve 50.

A second oil passage P2 branching from the first oil passage P1 between the regulator valve 49 and the check valve 50 is connected to the first lock oil chamber 33 (see FIG. 2) in the hydraulic actuator 25. A switching valve 54 and a first solenoid valve 55 made of a normally-closed solenoid valve are placed in the second oil passage P2. A third oil passage P3 branching from the first oil passage P1 between the regulator valve 49 and the check valve 50 is connected to the unlock oil chamber 32 (see FIG. 2) in the hydraulic actuator 25.

The switching valve 54 includes a spool 57 configured to slidably fitted into a valve hole 56. A third solenoid valve 59 made of a normally-closed solenoid valve is placed between a first oil chamber 58 at a right end of the valve hole 56 and the first oil passage P1. A fourth solenoid valve 61 made of a normally-closed solenoid valve is placed between a second oil chamber 60 at a left end of the valve hole 56 and the first oil passage P1. When the driver selects a D range (drive range), the third solenoid valve 59 is opened, and the fourth solenoid valve 61 is closed. Thereby, the spool 57 of the switching valve 54 moves leftward, and the second oil passage P2 is shut off. When the driver selects a range other than the D range, namely an R range (reverse range), a P range (parking range), an N range (neutral range), or the like, the third solenoid valve 59 is closed, and the fourth solenoid valve 61 is opened. Thereby, the spool 57 of the switching valve 54 moves rightward, and the second oil passage P2 established its communication.

Next, descriptions will be provided for the operation of the embodiment of the present invention including the foregoing configuration.

Figure 3:
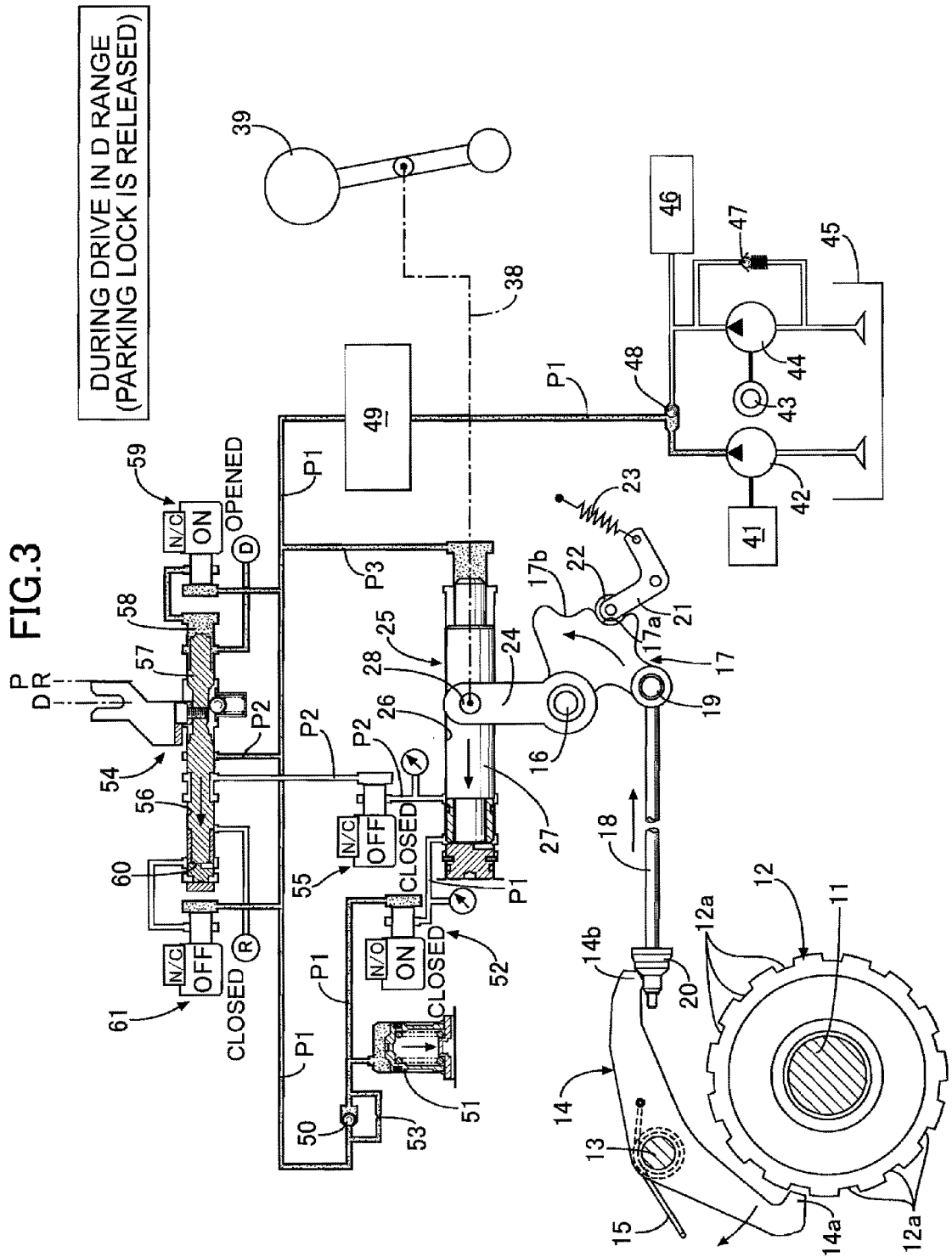
FIG. 3 is an operation explanatory view of the parking lock device during a drive in D range (parking lock released).

As shown in FIG. 3, during a drive in the D range, the hydraulic pressure from either the first hydraulic pump 42 driven by the engine 41 or the second hydraulic pump 44 driven by the wheel 43 is supplied to the first oil passage P1 via the three-way valve 48. The line pressure regulated by the regulator valve 49 passes through the check valve 50 and is accumulated in the accumulator 51. Here, the hydraulic pressure accumulated in the accumulator 51 is held by the check valve 50.

At this time, in accordance with a position of a shift lever, not illustrated, the third solenoid valve 59 is excited to be opened, while the fourth solenoid valve 61 is demagnetized to be closed. Thereby, the line pressure is supplied to the first oil chamber 58 in the switching valve 54, and the spool 57 moves leftward. By this, hydraulic pressure needed for the drive in the D range is outputted from the switching valve 54, and the second oil passage P2 is shut off. Meanwhile, the second solenoid valve 52 made of the normally-open solenoid valve is excited to be closed. Thereby, the hydraulic pressure in the accumulator 51 is shut off by the second solenoid valve 52, and is not transmitted to the second lock oil chamber 34 in the hydraulic actuator 25. Furthermore, the second oil passage P2 is shut off by the switching valve 54. Thereby, no line pressure is transmitted to the first lock oil chamber 33.

As a consequence, the piston 27 in the hydraulic actuator 25 moves leftward due to the line pressure transmitted to the unlock oil chamber 32 via the third oil passage P3. The movement of the piston 27 brings the cam 20 away from the cam follower 14b of the parking pawl 14 via the link 24, the detent plate 17 and the parking rod 18. The parking pawl 14 swings due to elastic force of the spring 15, and the locking claw 14a is separated from the tooth groove 12a of the parking gear 12. Thereby, the parking lock is released, and the vehicle travels forward without trouble. While the parking lock is in a released state, the detent roller 22 is engaged with the recessed portion 17a of the detent plate 17, and the state is stably maintained.

During the drive in the D range, since the second oil passage P2 is shut off by the switching valve 54, there is no likelihood that the line pressure is transmitted to the first lock oil chamber 33 in the hydraulic actuator 25. Accordingly, even if the hydraulic pressure in the accumulator 51 is transmitted to the second lock oil chamber 34 because the second solenoid valve 52 is opened due to its malfunction, the hydraulic pressure neither surpasses the line pressure transmitted to the unlock oil chamber 32, nor accordingly can make the piston 27 move rightward. This makes it possible to prevent the parking lock from operating during the drive in the D range.

Figure 4:
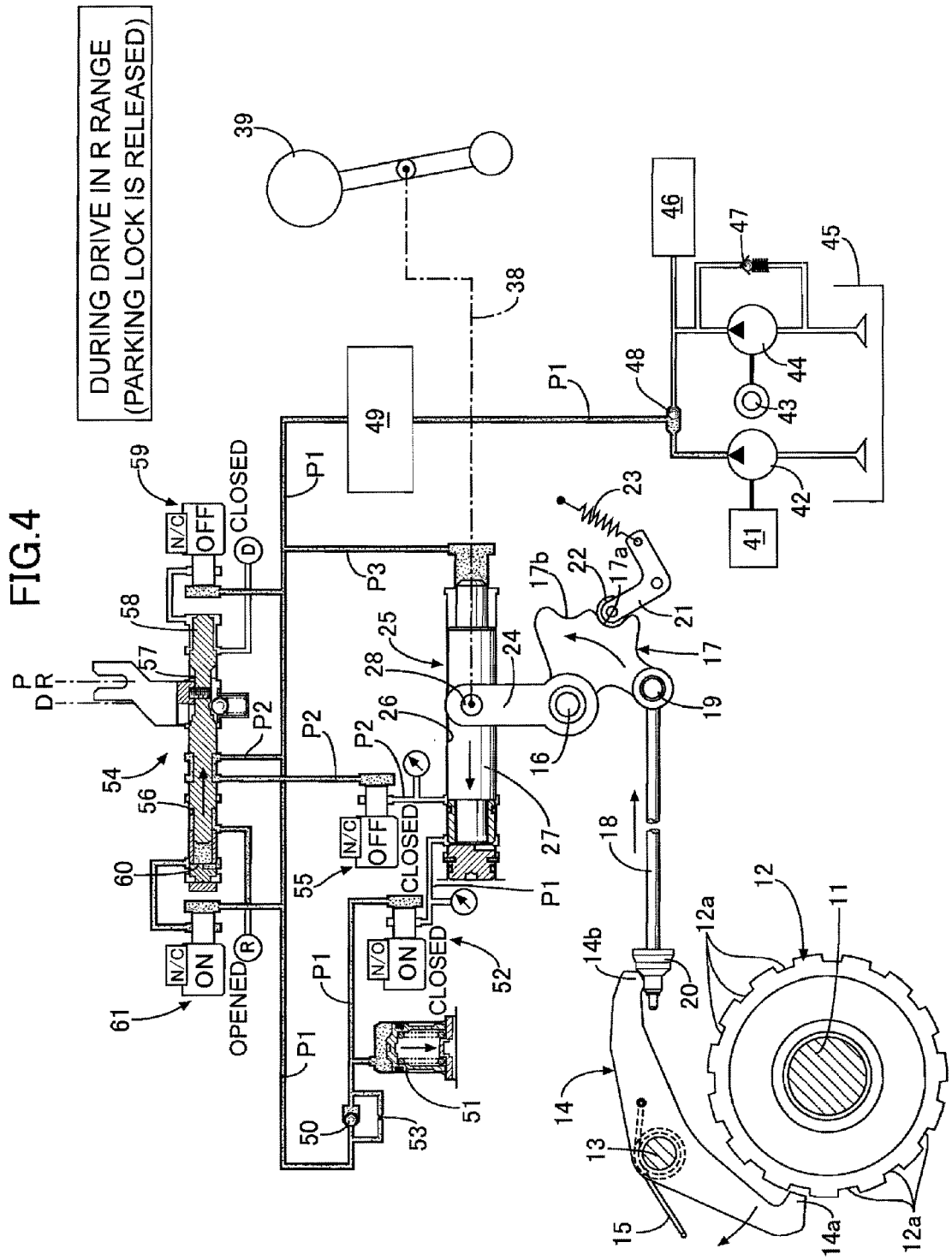
FIG. 4 is an operation explanatory view of the parking lock device during a drive in R range (parking lock released).

As shown in FIG. 4, during a drive in the R range, the hydraulic pressure from either the first hydraulic pump 42 driven by the engine 41 or the second hydraulic pump 44 driven by the wheel 43 is supplied to the first oil passage P1 via the three-way valve 48. The line pressure regulated by the regulator valve 49 passes through the check valve 50 and is accumulated in the accumulator 51.

At this time, in accordance with the position of the shift lever, not illustrated, the third solenoid valve 59 is demagnetized to be closed, while the fourth solenoid valve 61 is excited to be opened. Thereby, the hydraulic pressure is supplied to the second oil chamber 60 in the switching valve 54, and the spool 57 moves rightward. By this, hydraulic pressure needed for the drive in the R range is outputted from the switching valve 54, and the second oil passage P2 establishes its communication. Meanwhile, the first solenoid valve 55 made of the normally-closed solenoid valve is demagnetized to be closed, while the second solenoid valve 52 made of the normally-open solenoid valve is excited to be closed. Thereby, the line pressure in the second oil passage P2 is shut off by the first solenoid valve 55, and is not transmitted to the first lock oil chamber 33 in the hydraulic actuator 25. Furthermore, the hydraulic pressure in the accumulator 51 is shut off by the second solenoid valve 52, and is not transmitted to the second lock oil chamber 34 in the hydraulic actuator 25.

As a consequence, the piston 27 in the hydraulic actuator 25 moves leftward due to the line pressure transmitted to the unlock oil chamber 32 via the third oil passage P3. As in the case of the D range, the locking claw 14a of the parking pawl 14 is separated from the tooth groove 12a of the parking gear 12. Thereby, the parking lock is released, and the vehicle travels backward without trouble.

Figure 5:
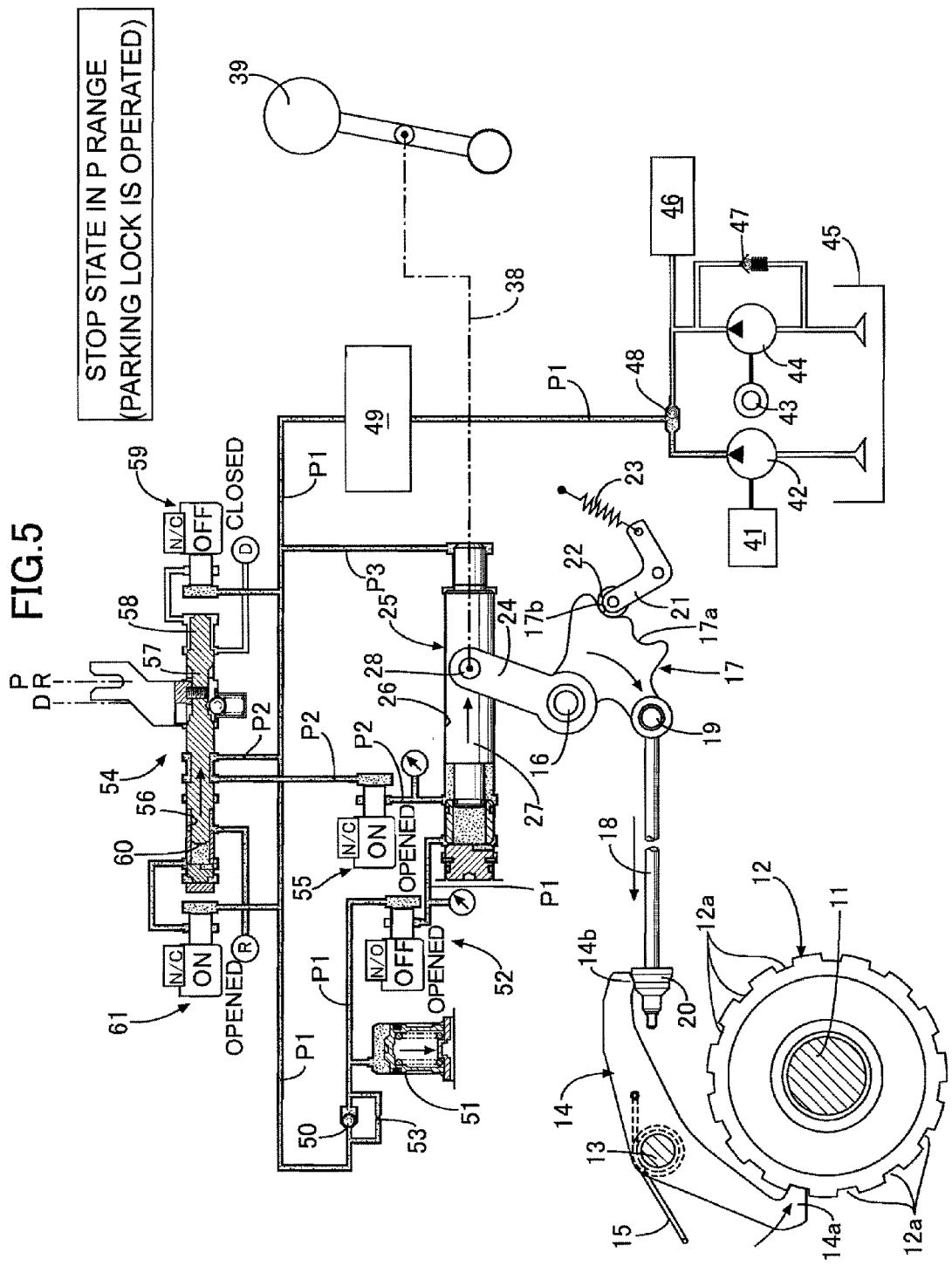
FIG. 5 is an operation explanatory view of the parking lock device during a stop in P range (parking lock operated).

As shown in FIG. 5, during a stop in the P range, the hydraulic pressure from the first hydraulic pump 42 driven by the engine 41 is supplied to the first oil passage P1 via the three-way valve 48. The line pressure regulated by the regulator valve 49 passes through the check valve 50 and is accumulated in the accumulator 51. Accordingly, when the first solenoid valve 55 made of the normally-closed solenoid valve is excited to be opened and the second solenoid valve 52 made of the normally-open solenoid valve is demagnetized to be opened, the line pressure in the second oil passage P2 passes through the first solenoid valve 55 to be transmitted to the first lock oil chamber 33 in the hydraulic actuator 25, and the hydraulic pressure in the accumulator 51 passes through the second solenoid valve 52 to be transmitted to the second lock oil chamber 34 in the hydraulic actuator 25. Thus, a rightward load generated in the first lock oil chamber 33 and the second lock oil chamber 34 exceeds a leftward load generated in the unlock oil chamber 32 so that the piston 27 moves rightward.

As a consequence, the movement of the piston 27 pushes up the cam follower 14b of the parking pawl 14 via the link 24, the detent plate 17, the parking rod 18 and the cam 20. The parking pawl 14 swings against the elastic force of the spring 15 so that the locking claw 14a is engaged with one of the tooth grooves 12a of the parking gear 12. Thereby, the parking lock is operated to restrict movement of the vehicle. While the parking lock is in an operating state, the detent roller 22 is engaged with the recessed portion 17b of the detent plate 17, and the state is stably maintained.

As described above, when the P range is selected, the line pressure is transmitted to the second oil passage P2 by the switching valve 54. For this reason, when the line pressure is transmitted to the first lock oil chamber 33 via the first solenoid valve 55 and the hydraulic pressure in the accumulator 51 is transmitted to the second lock oil chamber 34 via the second solenoid valve 52, the line pressure and hydraulic pressure thus transmitted surpass the line pressure transmitted to the unlock oil chamber 32, and make the piston 27 in the hydraulic actuator 25 move rightward. Accordingly, the parking lock can be operated.

As shown in FIG. 6, once the driver turns off an ignition switch for the purpose of parking the vehicle, both the first hydraulic pump 42 and the second hydraulic pump 44 stop their operation, and the line pressure disappears. Nevertheless, the hydraulic pressure accumulated in the accumulator 51 works in part of the first oil passage P1 downstream of the check valve 50. At this time, since the power supply is off, the second solenoid valve 52 made of the normally-open solenoid valve is automatically opened. Accordingly, the hydraulic pressure in the accumulator 51 passes through the second solenoid valve 52, and is transmitted to the second lock oil chamber 34 in the hydraulic actuator 25. In addition, since the line pressure disappears, no hydraulic pressure works on the unlock oil chamber 32 in the hydraulic actuator 25. The piston 27 moves rightward due to the hydraulic pressure in the second lock oil chamber 34. Thereby, the parking pawl 14 swings against the elastic force of the spring 15 so that the locking claw 14a is engaged with one of the tooth grooves 12a of the parking gear 12. Thus, the parking lock is automatically operated.

As shown in FIG. 7, once the vehicle stops with the engine 41 stopped, both the first hydraulic pump 42 and the second hydraulic pump 44 generate no hydraulic pressure. For this reason, the hydraulic pressure accumulated in the accumulator 51 gradually passes through the orifice 53 bypassing the check valve 50, and eventually disappears. At this time, if the engine 41 is started and the first hydraulic pump 42 generates hydraulic pressure, the parking lock can be released without trouble by supplying the hydraulic pressure to the unlock oil chamber 32 in the hydraulic actuator 25, as described by use of FIGS. 3 and 4.

When, however, the engine 41 cannot be started due to a defect in the power supply or the like, releasing of the parking lock by the hydraulic pressure, which has been described above, cannot be achieved. For this reason, the parking lock needs to be released by use of the manual operation lever 39 for the purpose of towing the vehicle. In this case, if the hydraulic pressure remains accumulated in the accumulator 51, the hydraulic pressure in the accumulator 51 is transmitted to the second lock oil chamber 34 in the hydraulic actuator 25 via the second solenoid valve 52 made of the normally-open solenoid valve, which causes a problem that the piston 27 in the hydraulic actuator 25 cannot be moved leftward by use of the manual operation lever 39 and therefore, the parking lock cannot be released.

On the contrary, in this embodiment, even if the engine 41 stops with the power supply off and the first hydraulic pump 42 cannot generate hydraulic pressure, the hydraulic pressure accumulated in the accumulator 51 gradually gets out via the orifice 53. For this reason, the parking lock can be released by moving the piston 27 in the hydraulic actuator 25 leftward by use of the manual operation lever 39 after a predetermined time passes. Accordingly, the above-mentioned problem is solved. In this case, since the hydraulic pressure in the accumulator 51 automatically gets out via the orifice 53, a complicated mechanism for enabling the manual operation lever 39 to work without interference from the hydraulic actuator 25 is no longer necessary, and simplification of a structure can be achieved.

Furthermore, the check valve 50 is placed in the first oil passage P1, downstream of the branch part of the second oil passage P2 in the first oil passage P1. This makes it possible to prevent the hydraulic pressure accumulated in the accumulator 51 from leaking into the second oil passage P2.

Moreover, the parking lock device includes: the first hydraulic pump 42 configured to be driven by the engine 41; and the second hydraulic pump 44 configured to be driven by the wheel 43. Of the oil discharged by the first hydraulic pump 42 and the oil discharged by the second hydraulic pump 44, the oil with the higher pressure is supplied via the three-way valve 48. Thus, it is possible to securely generate the hydraulic pressure to release the parking lock while the vehicle is traveling, and accordingly to block the parking lock from operating while the vehicle is traveling.

In addition, the hydraulic actuator 25 includes the piston 27 slidably fitted in the cylinder 26, and the piston 27 includes the O-ring 37 configured to seal the first lock oil chamber 33 and the second lock oil chamber 34. Accordingly, in a power supply-off state, when the parking lock is operated by moving the piston 27 rightward by use of the hydraulic pressure transmitted to the second lock oil chamber 34 from the accumulator 51, the hydraulic pressure in the second lock oil chamber 34 is blocked by the O-ring 37 from leaking into the first lock oil chamber 33 so that the parking lock can be operated securely.

Although the descriptions have been provided for the embodiment of the present invention, various design changes can be made to the present invention within the scope not departing from the gist of the present invention.

For example, although in the embodiment, the hydraulic actuator 25 includes the first lock oil chamber 33 and the second lock oil chamber 34, the first lock oil chamber 33 and the second lock oil chamber 34 may be integrated into a single lock oil chamber.

Furthermore, although the first solenoid valve 55, the third solenoid valve 59 and the fourth solenoid valve 61 are each made of the normally-closed solenoid valve, these solenoid valves, instead, may be each made of the normally-open solenoid valve.

In addition, the drive ranges of the present invention include the ranges which the driver selects when driving the vehicle forward, such as a L range (fixed first-speed range) or the like.

What is claimed is:

1. A parking lock device for a transmission including:
   a parking gear;
   a parking pawl configured to be lockable when in mesh with the parking gear;
   a hydraulic pressure generating source configured to generate line pressure;
   a hydraulic actuator configured to operate the parking pawl into a lock position and an unlock position by use of the line pressure; and
   a manual release device for manually operating the parking pawl into the unlock position, wherein
   the hydraulic actuator includes an unlock oil chamber at one end, and a lock oil chamber at the other end,
   the line pressure is transmitted to the unlock oil chamber,
   the line pressure can be transmitted to the lock oil chamber via a first solenoid valve,
   hydraulic pressure from an accumulator configured to accumulate the line pressure can be transmitted to the lock oil chamber via a second solenoid valve,
   a check valve configured to allow oil to flow toward the accumulator only is provided upstream of the accumulator, and
   an orifice is provided upstream of the accumulator and is connected to the accumulator such that the orifice is in parallel with the check valve.

2. The parking lock device for a transmission of claim 1, wherein
   the hydraulic pressure generating source includes a first hydraulic pump driven by an engine, and a second hydraulic pump driven by a wheel, and
   one of oil discharged by the first hydraulic pump and oil discharged by the second hydraulic pump, which has a higher pressure than the other, is supplied via a three-way valve.

3. The parking lock device for a transmission of claim 1, wherein
   the lock oil chamber includes a first lock oil chamber to which the line pressure can be transmitted via the first solenoid valve, and a second lock oil chamber to which the hydraulic pressure from the accumulator can be transmitted via the second solenoid valve,
   the hydraulic actuator includes a piston slidably fitted in a cylinder, and
   the piston includes an O-ring configured to seal a gap between the first lock oil chamber and the second lock oil chamber.

4. The parking lock device for a transmission of claim 1, wherein the second solenoid valve is of a normally-open type.

5. The parking lock device for a transmission of claim 4, further comprising:
   a first oil passage connecting the hydraulic pressure generating source to the second solenoid valve;
   a second oil passage branching from the first oil passage, and connected to the first solenoid valve;
   a third oil passage branching from the first oil passage, and connected to the unlock oil chamber; and
   a switching valve placed in the second oil passage, wherein
   when a driver selects a range other than a drive range, the switching valve establishes communication through the second oil passage,
   when the driver selects the drive range, the switching valve shuts off the second oil passage.

6. The parking lock device for a transmission of claim 1, further comprising:
   a first oil passage connecting the hydraulic pressure generating source to the second solenoid valve;
   a second oil passage branching from the first oil passage, and connected to the first solenoid valve;
   a third oil passage branching from the first oil passage, and connected to the unlock oil chamber; and
   a switching valve placed in the second oil passage, wherein
   when a driver selects a range other than a drive range, the switching valve establishes communication through the second oil passage,
   when the driver selects the drive range, the switching valve shuts off the second oil passage.

7. The parking lock device for a transmission of claim 6, wherein the check valve is placed in the first oil passage, downstream of a branch part of the second oil passage in the first oil passage.

* * * * *